United States Patent
Davila et al.

(10) Patent No.: US 10,770,965 B2
(45) Date of Patent: *Sep. 8, 2020

(54) CONTROL OF SERIES-PARALLEL MODE (SPM) CLAMPED FLYBACK CONVERTER

(71) Applicant: Apple Inc., Cupertino, CA (US)

(72) Inventors: Marco A. Davila, Spicewood, TX (US); Joao L. Andres, Austin, TX (US); Bogdan T. Bucheru, Austin, TX (US); Vijay Phadke, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/365,100

(22) Filed: Mar. 26, 2019

(65) Prior Publication Data

US 2019/0222113 A1 Jul. 18, 2019

Related U.S. Application Data

(63) Continuation of application No. 15/847,008, filed on Dec. 19, 2017, now abandoned, and a
(Continued)

(51) Int. Cl.
*H02M 1/34* (2007.01)
*H02M 1/08* (2006.01)
*H02M 3/335* (2006.01)

(52) U.S. Cl.
CPC ............ *H02M 1/34* (2013.01); *H02M 1/08* (2013.01); *H02M 3/33569* (2013.01);
(Continued)

(58) Field of Classification Search
CPC ...... H02M 1/08; H02M 1/34; H02M 3/33576; H02M 2001/342
See application file for complete search history.

(56) References Cited

U.S. PATENT DOCUMENTS

| 5,430,633 A | 7/1995 | Smith |
| 5,883,795 A | 3/1999 | Farrington |
(Continued)

FOREIGN PATENT DOCUMENTS

| CN | 101453168 A | 6/2009 |
| CN | 101562406 A | 10/2009 |
(Continued)

OTHER PUBLICATIONS

Watson, et al., "Utilization Of An Active-Clamp Circuit to Achieve Soft Switching in Flyback Converters," Power Electronics Specialists Conference, PESC 1994 (Jun. 25, 1994).
(Continued)

*Primary Examiner* — Matthew V Nguyen
*Assistant Examiner* — Jye-June Lee
(74) *Attorney, Agent, or Firm* — Blank Rome LLP

(57) ABSTRACT

This disclosure describes a flyback converter with a series-parallel mode (SPM) active clamp. The active clamp, coupled in parallel with the primary coil, may include a clamp switch, two or more snubber capacitors, and associated diodes. The active clamp may be configured to absorb and retain the leakage energy from the leakage inductance of the flyback converter. The clamp switch may be turned on selectively as the primary switch approaches one of a plurality peak values to adjust frequencies of the switching devices. With the active clamp circuit, the flyback converter may first re-capture the leakage energy in the active clamp circuit and then recover it back to the power source.

24 Claims, 9 Drawing Sheets

Related U.S. Application Data continuation-in-part of application No. 15/829,253, filed on Dec. 1, 2017, now Pat. No. 10,250,149, which is a continuation of application No. 15/585,715, filed on May 3, 2017, now Pat. No. 9,893,636, which is a continuation of application No. 15/042,885, filed on Feb. 12, 2016, now Pat. No. 9,774,270.

(60) Provisional application No. 62/447,036, filed on Jan. 17, 2017, provisional application No. 62/175,881, filed on Jun. 15, 2015.

(52) U.S. Cl.
CPC .. *H02M 3/33576* (2013.01); *H02M 2001/342* (2013.01); *H02M 2001/346* (2013.01); *Y02B 70/1491* (2013.01)

(56) References Cited

U.S. PATENT DOCUMENTS

| | | | |
|---|---|---|---|
| 6,061,252 A | 5/2000 | Hosotani | |
| 6,069,803 A | 5/2000 | Cross | |
| 6,166,924 A | 12/2000 | Assow | |
| 6,191,960 B1 | 2/2001 | Fraidlin | |
| 6,690,586 B2 | 2/2004 | Hosotani | |
| 7,006,364 B2 | 2/2006 | Jin | |
| 7,554,820 B2 | 6/2009 | Stanley | |
| 7,864,549 B1 | 1/2011 | Wittenbreder | |
| 7,869,235 B2 | 1/2011 | Lin | |
| 8,315,073 B2 | 11/2012 | Matsumoto | |
| 8,693,223 B2 | 4/2014 | Lin | |
| 9,160,234 B2 | 10/2015 | Yamaguchi | |
| 9,240,724 B2 | 1/2016 | Sigamani | |
| 9,276,483 B2 | 3/2016 | Yang | |
| 9,774,270 B2 * | 9/2017 | Phadke | H02M 3/33546 |
| 9,893,636 B2 | 2/2018 | Phadke | |
| 9,923,472 B1 * | 3/2018 | Phadke | H02M 1/34 |
| 2003/0048645 A1 | 3/2003 | Hosotani | |
| 2003/0147264 A1 | 8/2003 | Jinno | |
| 2006/0062024 A1 | 3/2006 | Hosotani | |
| 2006/0176715 A1 | 8/2006 | Hosotani | |
| 2006/0203521 A1 | 9/2006 | Tsuruya | |
| 2007/0019883 A1 | 1/2007 | Wong | |
| 2007/0263415 A1 * | 11/2007 | Jansen | H02M 3/33507 363/21.03 |
| 2009/0097281 A1 | 4/2009 | Lin | |
| 2009/0167930 A1 | 7/2009 | Safaee-Rad | |
| 2009/0257254 A1 * | 10/2009 | Leu | H02M 1/34 363/40 |
| 2009/0316444 A1 | 12/2009 | Yamaguchi | |
| 2011/0141785 A1 | 6/2011 | Duan | |
| 2012/0098947 A1 | 4/2012 | Wilkes | |
| 2012/0314458 A1 | 12/2012 | Hosotani | |
| 2013/0010067 A1 | 1/2013 | Veeraraghavan | |
| 2013/0235252 A1 | 9/2013 | Tseng | |
| 2014/0029312 A1 | 1/2014 | Telefus | |
| 2014/0043863 A1 | 2/2014 | Telefus | |
| 2014/0145591 A1 | 5/2014 | Godyak | |
| 2014/0185333 A1 * | 7/2014 | Yang | H02M 3/33569 363/21.12 |
| 2014/0226367 A1 | 8/2014 | Hu | |
| 2014/0334194 A1 * | 11/2014 | Davila | H02M 3/33576 363/21.02 |
| 2015/0062370 A1 | 3/2015 | Shroff | |
| 2015/0249397 A1 * | 9/2015 | Ogasawara | H02M 1/4266 315/200 R |
| 2016/0365801 A1 * | 12/2016 | Phadke | H02M 3/33546 |
| 2018/0062529 A1 | 3/2018 | Song | |

FOREIGN PATENT DOCUMENTS

| | | |
|---|---|---|
| CN | 101702578 A | 5/2010 |
| CN | 103066837 A | 4/2013 |
| CN | 103607108 A | 2/2014 |
| CN | 103746564 A | 4/2014 |
| CN | 203632933 U | 6/2014 |
| CN | 205883055 U | 1/2017 |
| EP | 2012420 A1 | 1/2009 |
| EP | 2200165 A1 | 6/2010 |
| JP | H03256558 A | 11/1991 |
| JP | H11018426 A | 1/1999 |
| JP | 2000324830 A | 11/2000 |
| JP | 2002199726 A | 7/2002 |
| JP | 2004282917 A | 10/2004 |
| JP | 2005094946 A | 4/2005 |
| JP | 2005160218 A | 6/2005 |
| JP | 2009261210 A | 11/2009 |
| JP | 2012110117 A | 6/2012 |
| WO | 2016011762 A1 | 1/2016 |

OTHER PUBLICATIONS

Office Action received in Japanese Patent Application No. 2018-153184, dated Jun. 10, 2019.

* cited by examiner

CONTROL OF SERIES-PARALLEL MODE (SPM) CLAMPED FLYBACK CONVERTER

CROSS-REFERENCE TO RELATED APPLICATIONS

This application is a continuation of U.S. patent application Ser. No. 15/847,008, which claims priority to U.S. Provisional Patent Application No. 62/447,036. This application is also a continuation-in-part of U.S. patent application Ser. No. 15/829,253, which is a continuation of U.S. patent application Ser. No. 15/585,715, which is a continuation of U.S. patent application Ser. No. 15/042,885, which claims priority to U.S. Provisional Patent Application No. 62/175,881. This application claims priority to each of the foregoing applications, each of which is also hereby incorporated by reference in its entirety.

TECHNICAL FIELD

This disclosure relates generally to the field of power converters and, in particular, to the control of flyback converters with series-parallel mode ("SPM") active clamps.

BACKGROUND

Flyback converters are commonly used as isolated power supplies for electronic devices. For example, a flyback converter typically includes two coils that are electromagnetically coupled with each other, like primary and secondary windings of a transformer. The primary coil is coupled to an input circuit/power source, and the secondary coil is coupled to an output circuit/load, thus providing desired isolation between the input and output. By controlling a flow of current through the primary coil using a primary switch, a flyback converter may produce a regulated output voltage of a desired target value at the output.

The primary and secondary coils may have parasitic leakage inductances that also capture energy ("leakage energy"). The leakage inductances may cause additional losses unless the energy stored therein is recovered. Thus, some form of leakage energy recovery circuitry may be included in a flyback converter. Additionally, a drive toward miniaturization and portability in the consumer electronic industry pushes such power converters to be packaged in smaller and smaller volumes. Simply decreasing the size and/or component count, however, typically makes it harder to achieve a desired level of efficiency, because operations at high switching frequencies that can facilitate miniaturization may otherwise negatively affect efficiency. Thus, what is needed is a flyback converter adapted to recover the leakage energy to improve efficiency that also provides flexibility to avoid operating at unnecessarily high frequencies.

SUMMARY

Described herein are various devices and methods for operating flyback converters with serial-parallel mode ("SPM") active clamps, in which leakage energy is absorbed and retained by clamps and then returned to the input power source. In some embodiments described herein, the converters may transfer the leakage energy from the leakage inductance to snubber capacitors by charging the snubber capacitors in series. Further, the converter embodiments described herein may retain the leakage energy in the snubber capacitors, while the normal "working" energy is being delivered through the transformer to a load of the output circuitry. Still further, when all the "working" energy stored in the transformer is delivered to the load, the converter embodiments described herein may then start a resonance between the primary coil (and leakage inductance) and a parasitic capacitance of the primary switch. The resonance may create a sinusoidal voltage across the primary switch, which may include a plurality of peak values. When the primary switch's voltage approaches a peak value, the clamp switch may reach a valley voltage. Still further, the converter embodiments described herein may turn on the clamp switch selectively near one of the primary switch's peak values, thus minimizing the clamp switch's turn-on losses. The clamp switch may be turned on at the first peak of the primary switch's voltage, or may be delayed to the subsequent peaks to extend the cycles and slow down the switching frequency. The converter embodiments described herein may then start a transfer of leakage energy from the snubber capacitors to the primary coil, by discharging the snubber capacitors in parallel and driving a primary winding current in an opposite direction. Still further, the converter embodiments described herein may turn off the clamp switch adaptively, and after a delay, at zero-voltage switching (ZVS) or a minimum non-zero voltage turn on the main primary switch, thus returning the leakage energy back to the input power source.

BRIEF DESCRIPTION OF THE DRAWINGS

Various embodiments of the disclosed concepts are illustrated by way of example and not by way of limitation in the accompanying drawings in which like references indicate similar elements. It should be noted that references to "an", "one" or "another" embodiment in this disclosure are not necessarily to the same or different embodiment, and they mean at least one. In order to be concise, a given figure may be used to illustrate the features of more than one embodiment, or more than one species of the disclosure, and not all elements in the figure may be required for a given embodiment or species.

DETAILED DESCRIPTION

In the following description, for purposes of explanation, numerous specific details are set forth in order to provide a thorough understanding of the disclosed concepts. As part of this description, some of this disclosure's drawings represent structures and devices in block diagram form in order to avoid obscuring the disclosure. In the interest of clarity, not all features of an actual implementation are described in this disclosure. Moreover, the language used in this disclosure has been principally selected for readability and instructional purposes, and may not have been selected to delineate or circumscribe the disclosed subject matter, resort to the claims being necessary to determine such disclosed subject matter.

Figure 1:
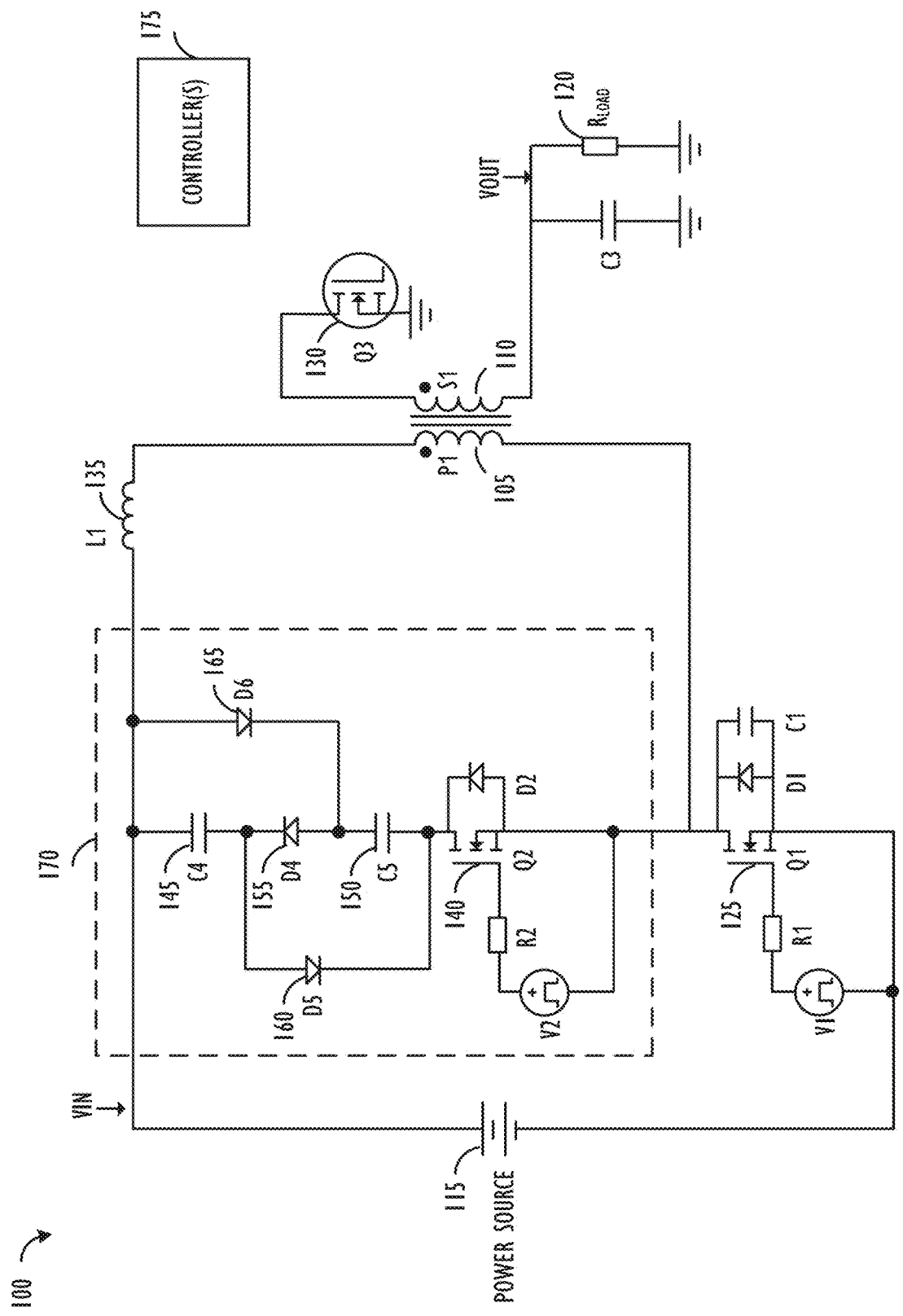
FIG. 1 is schematic diagram illustrating exemplary SPM clamped flyback converter 100 in accordance with one embodiment.

FIG. 1 is a schematic diagram illustrating exemplary clamped flyback converter 100. As shown in FIG. 1, converter 100 may include primary coil P1 105 and secondary coil S1 110, which are electromagnetically coupled with each other. Primary coil P1 105 may receive an input voltage $V_{IN}$ from power source 115, while secondary coil S1 110 may supply an output voltage $V_{OUT}$ to load 120 (e.g., resistance $R_{LOAD}$) through secondary switch Q3 130. To simplify explanation, it is assumed herein that primary coil P1 105 and secondary coil S1 110 possess an ideal electromagnetic coupling, meaning that all of the energy stored in primary coil P1 105 will be transferred to secondary coil S1 110 without losses. Any losses associated with the electromagnetic coupling between the two coils is represented by a lump-sum leakage inductance L1 135, as shown in FIG. 1. Accordingly, leakage inductance L1 135 may capture a leakage energy that is the energy not transferred from the real, non-ideal primary coil to the real, non-ideal secondary coil.

Flyback converter 100 may further comprise primary switch Q1 125, e.g., a first metal-oxide semiconductor field-effect transistor (MOSFET), coupled in series with primary coil P1 105. Other types of switching devices could also be used. Additionally, flyback converter 100 may include active clamp circuit ("clamp") 170, which may be coupled in parallel with primary coil P1 105 (and leakage inductance L1 135). In the illustrated embodiment, clamp 170 may comprise clamp switch Q2 140, e.g., a second MOSFET (or other type of switching device), in series with snubber capacitors C4 145 and C5 150 and diode D4 155. Clamp 170 may further include diodes D5 160 and D6 165, wherein diode D5 160 may be coupled in parallel with snubber capacitor C5 150 and diode D4 155, and diode D6 165 may be coupled in parallel with snubber capacitor C4 145 and diode D4 155. Other active clamp circuit arrangements are also possible. Secondary switch Q3 130 may be controlled in coordination with primary switching Q1 125, providing synchronous rectification to load 120. Note that switch Q3 130 may also be implemented by a diode. Smoothing capacitor C3 may be coupled between secondary output terminal and ground, as a filter for output voltage $V_{OUT}$.

Flyback converter 100 may include one or more controller(s) 175, which may be coupled to and generate respective control signals for switches Q1 125, Q2 140, and/or Q3 130. FIG. 1 also depicts gate drive circuits for primary switch Q1 125 (comprising voltage source V1 and resistor R1) and clamp switch Q2 140 (comprising voltage source V2 and resistor R2), respectively. Note that switches Q1 125 and Q2 140 may also comprise an intrinsic antiparallel body diode (e.g., diodes D1 and D2) and a parallel parasitic capacitance (e.g., capacitor C1) as shown in FIG. 1. Additionally, as an alternative to MOSFETs, flyback converter 100 may use other types of semiconductor switching devices, for example, insulated gate bipolar transistors (IG-BTs), junction gate field-effect transistors (JFETs), silicon carbine and/or gallium nitride devices.

Figure 2:
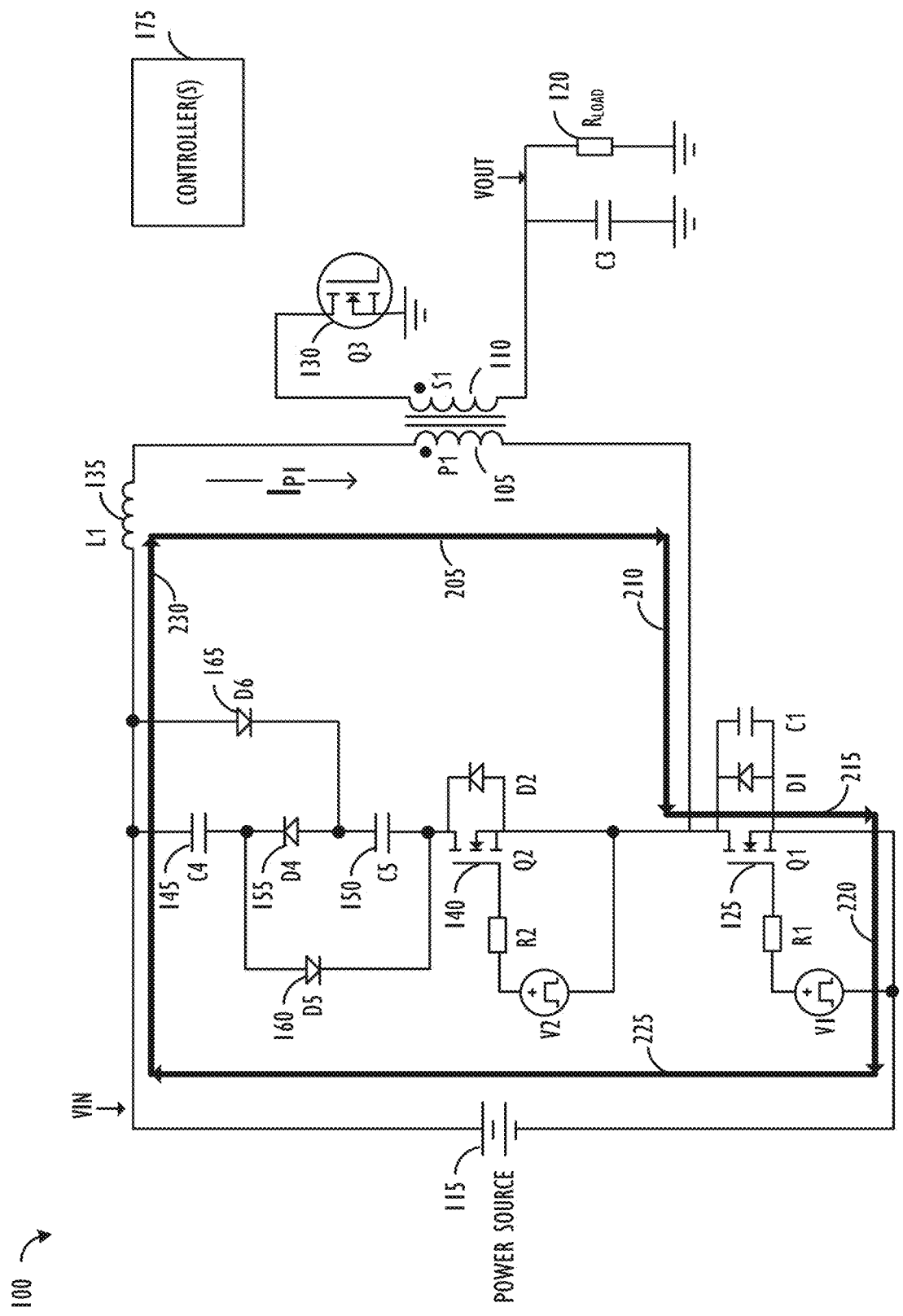
FIG. 2 shows the operation of exemplary flyback converter 100 in Operational Stage I in accordance with one embodiment.

Operations of flyback converter 100 may be explained in sequential Operational Stages I-V, which are schematically illustrated in FIGS. 2-6. FIG. 2 illustrates the operation of flyback converter 100 in Operational Stage I. In Operational Stage I, clamp switches Q2 140 and secondary switch Q3 130 remain open, and converter 100 may turn on primary switch Q1 125. When primary switch Q1 125 is closed, power source 115 causes a primary winding current $I_{P1}$ in primary coil P1 105, as illustrated by lines 205-230. Because secondary switch Q3 130 remains open, and primary winding current $I_{P1}$ builds up in primary coil P1 105, energy is accumulated/stored in primary coil P1 105. Additionally, as primary winding current $I_{P1}$ also flows through leakage inductance L1 135, a leakage energy may be captured by leakage inductance L1 135.

Figure 3:
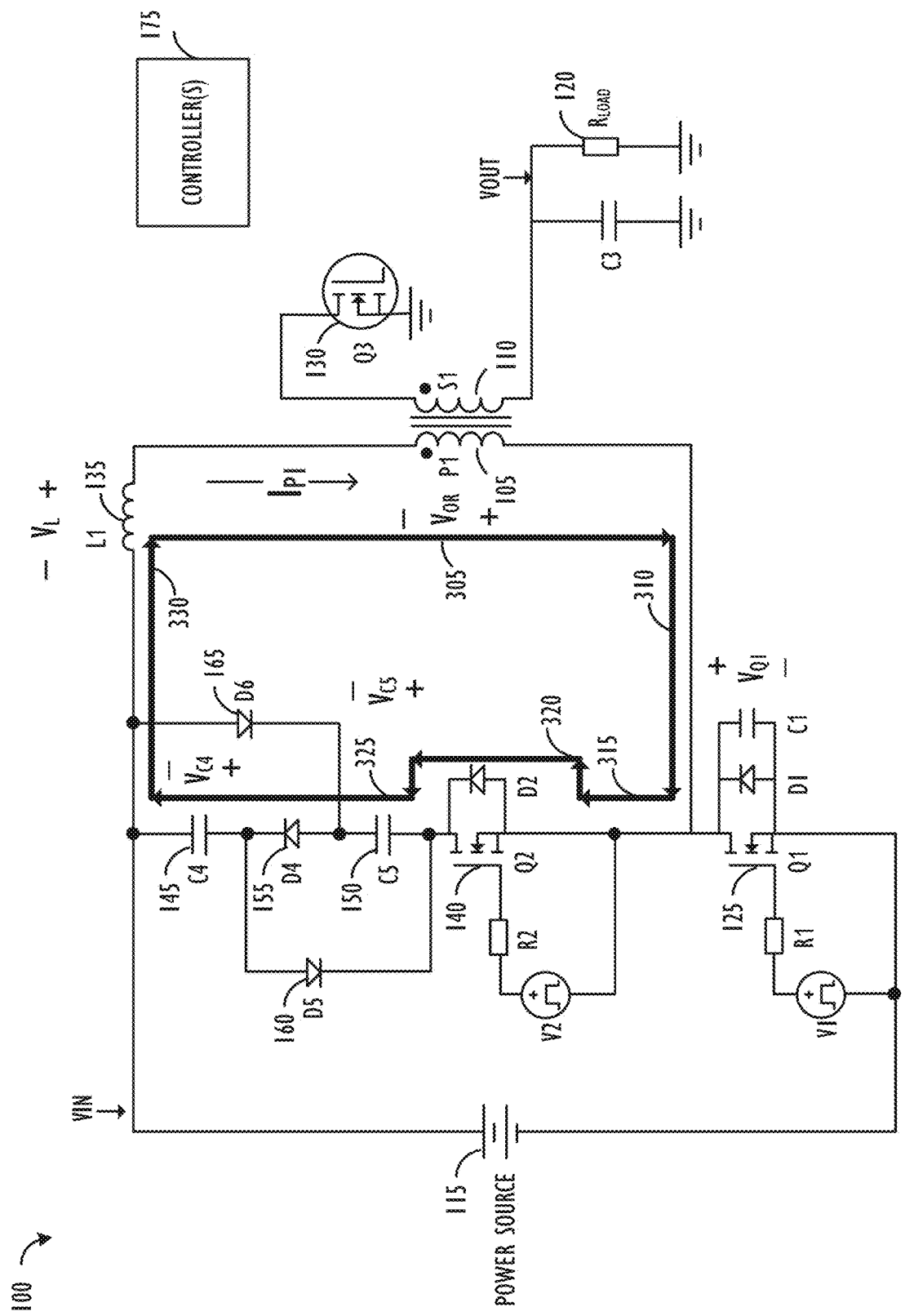
FIG. 3 shows the operation of exemplary flyback converter 100 in Operational Stage II in accordance with one embodiment.

FIG. 3 illustrates the operation of flyback converter 100 in Operational Stage II. In Operational Stage II, flyback converter 100 may turn off primary switch Q1 125 and turn on secondary switch Q3 130. In Operational Stage II, primary winding current $I_{P1}$ may start to decline because primary coil P1 105 is disconnected from power source 115. This may create an induced voltage across secondary coil S1 110 that causes a current to flow through closed secondary switch Q3 130, thus transferring the stored energy from primary coil P1 105, through secondary coil S1 110, to load 120. Meanwhile, primary winding current $I_{P1}$ may be forced to flow into snubber capacitors C4 145 and C5 150 through clamp switch Q2 140's body diode D2 and diode D4 155, as shown by lines 305-330, thus charging snubber capacitors C4 145 and C5 150 in series. As aforementioned, it is assumed that all energy stored in primary coil P1 105 will be transferred to secondary coil S1 110 without losses; the losses being modeled by leakage inductance L1 135. Thus, only leakage energy may be delivered from leakage inductance L1 135 into snubber capacitors C4 145 and C5 150. Operational Stage II may continue until both of the currents through primary coil P1 105 and secondary coil S1 110 reduce to zero, which indicates that all the normal "working" energy is transferred through the transformer to load 120.

Referring to FIG. 3, in Operational Stage II, each snubber capacitor C4 145 and C5 150 may develop respective clamp voltages $V_{C4}$ and $V_{C5}$ by the charging current. The conduction of body diode D2 brings the clamp switch Q2 125's voltage $V_{Q2}$ to approximately zero (e.g., a forward voltage drop across diode D2), thus the clamp voltages $V_{C4}$ and $V_{C5}$ and primary switch Q1 125's voltage $V_{Q1}$ may be determined according to equations (1) and (2):

$$V_{C4}+V_{C5}=V_{OR}+V_{L1}=(V_{OUT}+V_{Q3})\times(Np/Ns)+V_{L1} \quad (1)$$

$$V_{Q2}=V_{IN}+V_{C4}+V_{C5} \quad (2)$$

where $V_{OR}$ is the reflected output voltage across primary coil P1 105, $V_{L1}$ is an induced voltage of leakage inductance L1 135, $V_{OUT}$ is the output voltage of converter 100, $V_{Q3}$ is the voltage drop across secondary switch Q3 130 (a small voltage when Q3 130 conducts), and Np/Ns represents the turns-ratio between primary coil P1 105 and secondary coil S1 110. For example, if converter 100 converts 300V input voltage (e.g., $V_{IN}$=300V) to 5V voltage (e.g., $V_{OUT}$=5V), turns-ratio Np/Ns between primary and secondary coils is 14:1, and voltage drop of secondary switch Q3 130 is 0.7V, then according to equation (1) reflected output voltage $V_{OR}$ may be (5+0.7)×14=79.8V. To simplify explanation, it is assumed herein that snubber capacitors C4 145 and C5 150 have equal capacitances. Thereby, each snubber capacitor C4 145 and C5 150 may be charged to a voltage equal to half of reflected voltage $V_{or}$ plus half of induced leakage voltage $V_{L1}$. Following the exemplary numbers, if snubber capacitors C4 145 and C5 150 each is charged to 50V, then approximately 40V (i.e., 79.8V/2) comes from reflected output voltage $V_{OR}$ and the additional 10V (to reach 50V) is contributed by the leakage energy of leakage inductance L1 135. Between the two voltages $V_{OR}$ and $V_{L1}$, reflected output voltage $V_{OR}$ is typically dominant. Thereby, respective clamp voltages $V_{C4}$ and $V_{C5}$ of snubber capacitors C4 145 and C5 150 may remain substantially constant with a regulated output voltage $V_{OUT}$. According to equation (2), voltage VQ1 over primary switch Q1 125 may reach 400V (e.g., 300+50+50=400V). Note that if snubber capacitors C4 145 and C5 150 have different capacitances, they may be charged to different clamp voltages. This may slightly affect the discharging sequence of snubber capacitors C4 145 and C5 150, which will be discussed in the following descriptions.

Once the leakage energy has been transferred from leakage inductance L1 135 to snubber capacitors C4 145 and C5 150, diode D4 155 that is in series with the snubber capacitors may block any reverse current. Since respective clamp voltages $V_{C4}$ and $V_{C5}$ are less than the total voltage ($V_{or}+V_{L1}$) across primary coil P1 105 and leakage inductance L1 135, diodes D5 160 and D6 165 may become reverse biased. Thus, snubber capacitors C4 145 and C5 150 may be disconnected from primary coil P1 105, which causes C4 145 and C5 150 to retain the leakage energy absorbed from leakage inductance L1 135. As the body diode D2 stops conducting, a voltage $V_{Q2}$ may be built up across clamp switch Q2 140. Voltage $V_{Q2}$ may be determined according to equation (3):

$$V_{Q2}=V_{IN}+V_{C4}+V_{C5}-V_{Q1} \qquad (3)$$

where input voltage $V_{IN}$ and clamp voltages $V_{C4}$ and $V_{C5}$ may remain substantially constant. Thus, clamp switch Q2 140's voltage $V_{Q2}$ may be inversely proportional to the primary switch Q1 125's voltage $V_{Q1}$. In other words, voltage $V_{Q2}$ may reach a valley value when voltage $V_{Q1}$ approaches a peak value.

Figure 4:
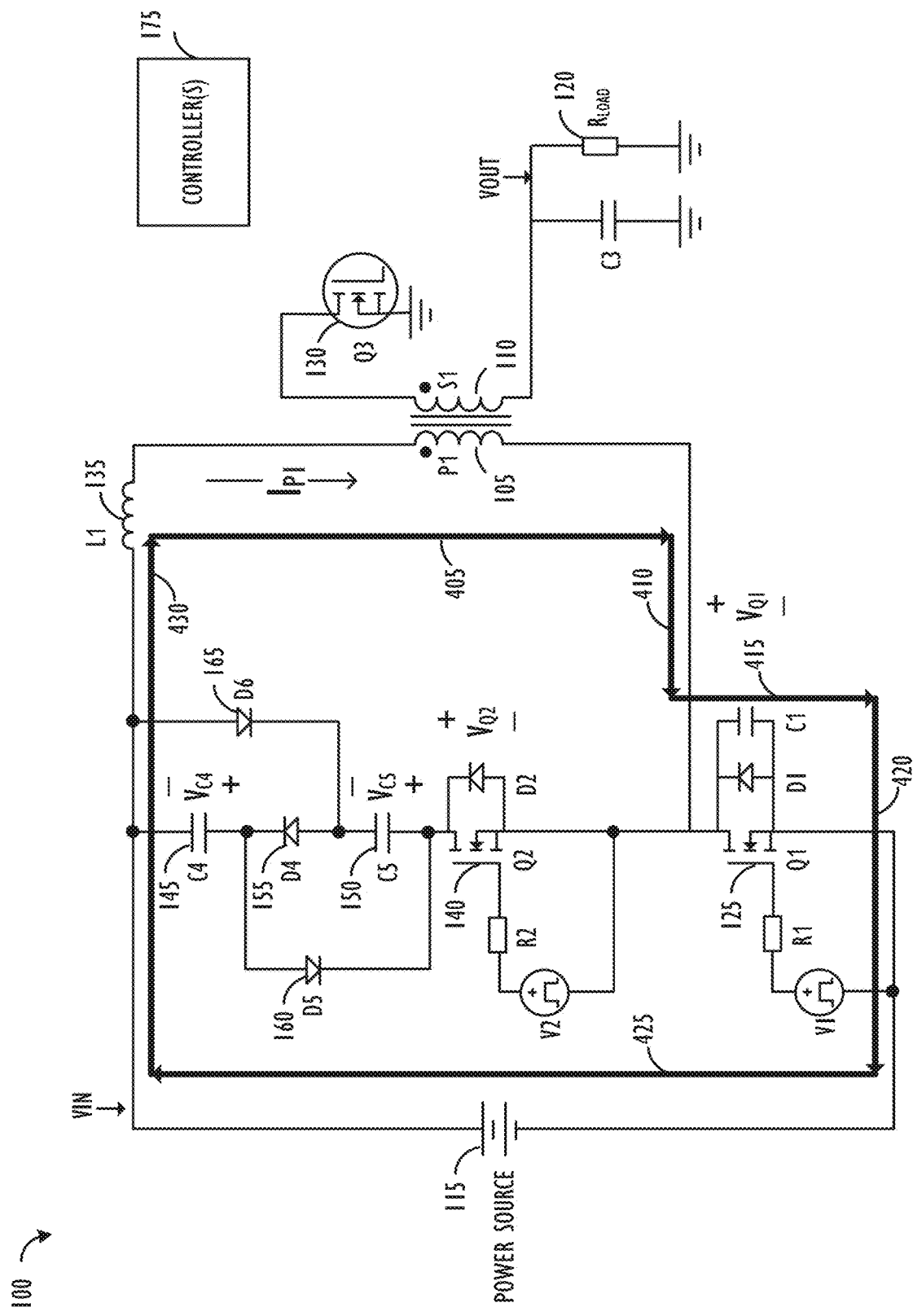
FIG. 4 shows the operation of exemplary flyback converter 100 in Operational Stage III in accordance with one embodiment.

Operational Stage II continues until all the stored energy is transferred from primary coil P1 105 to secondary coil 110 and load 120. Converter 100 may turn off secondary switch Q3 130 and enter Operational Stage III. Referring to FIG. 4, in Operational Stage III, primary coil P1 105 (and leakage inductance L1 135) is placed in series with the parasitic capacitance C1 of primary switch Q1 125 forming an inductor-capacitor (LC) resonant circuit. Under the stimulation of power source 115, this LC circuit may generate an oscillating primary winding current $I_{P1}$, as shown by lines 405-430, and a sinusoidal voltage $V_{Q1}$ over primary switch 125. This sinusoidal voltage $V_{Q1}$ may include a plurality of peak values. As described in FIG. 3, each peak value may correspond to a valley voltage for $V_{Q1}$ of clamp switch Q2 140. Because switching losses of a semiconductor switching devices heavily depend on its switching voltages, it may thus be desirable to turn on clamp switch Q2 140 selectively near one of voltage $V_{Q1}$'s peak values, i.e., near one of voltage $V_{Q2}$'s valley values.

Figure 5:
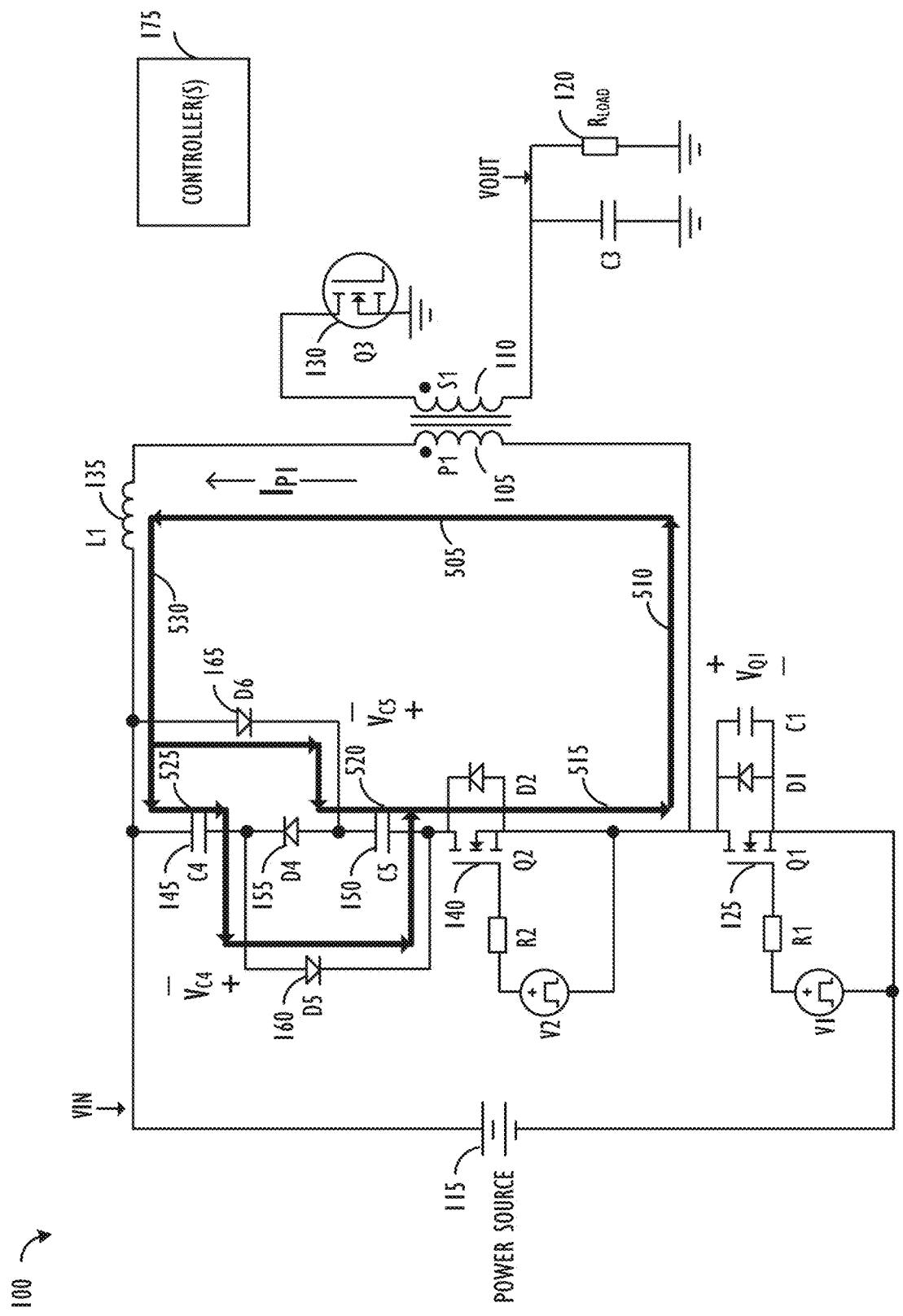
FIG. 5 shows the operation of exemplary flyback converter 100 in Operational Stage IV in accordance with one embodiment.

The operation of power converter 100 in Operational Stage IV is shown in FIG. 5, after clamp switch Q2 140 is turned on. With the falling of voltage $V_{Q1}$ during the LC resonance, diodes D5 160 and D6 165 may become forward biased and start to conduct. This may discharge snubber capacitors C4 145 and C5 150 in parallel and generate a primary winding current $I_{P1}$ in an opposite direction, as indicated by lines 505-530. This may interrupt the resonance and transfer the absorbed leakage energy from C4 145 and C5 150 to primary coil P1 105. As aforementioned, when snubber capacitors C4 145 and C5 150 have different capacitances, snubber capacitors C4 145 and C5 150 may be charged to different clamp voltages. Therefore, the snubber capacitor with the lower clamp voltage may be discharged first. Once the diode (e.g., diode D5 160 or D6 165) of the other snubber capacitor with the higher clamp voltage becomes forward biased, the other snubber capacitor may start to discharge, and then snubber capacitors C4 145 and C5 150 may be discharged in parallel together.

Figure 6:
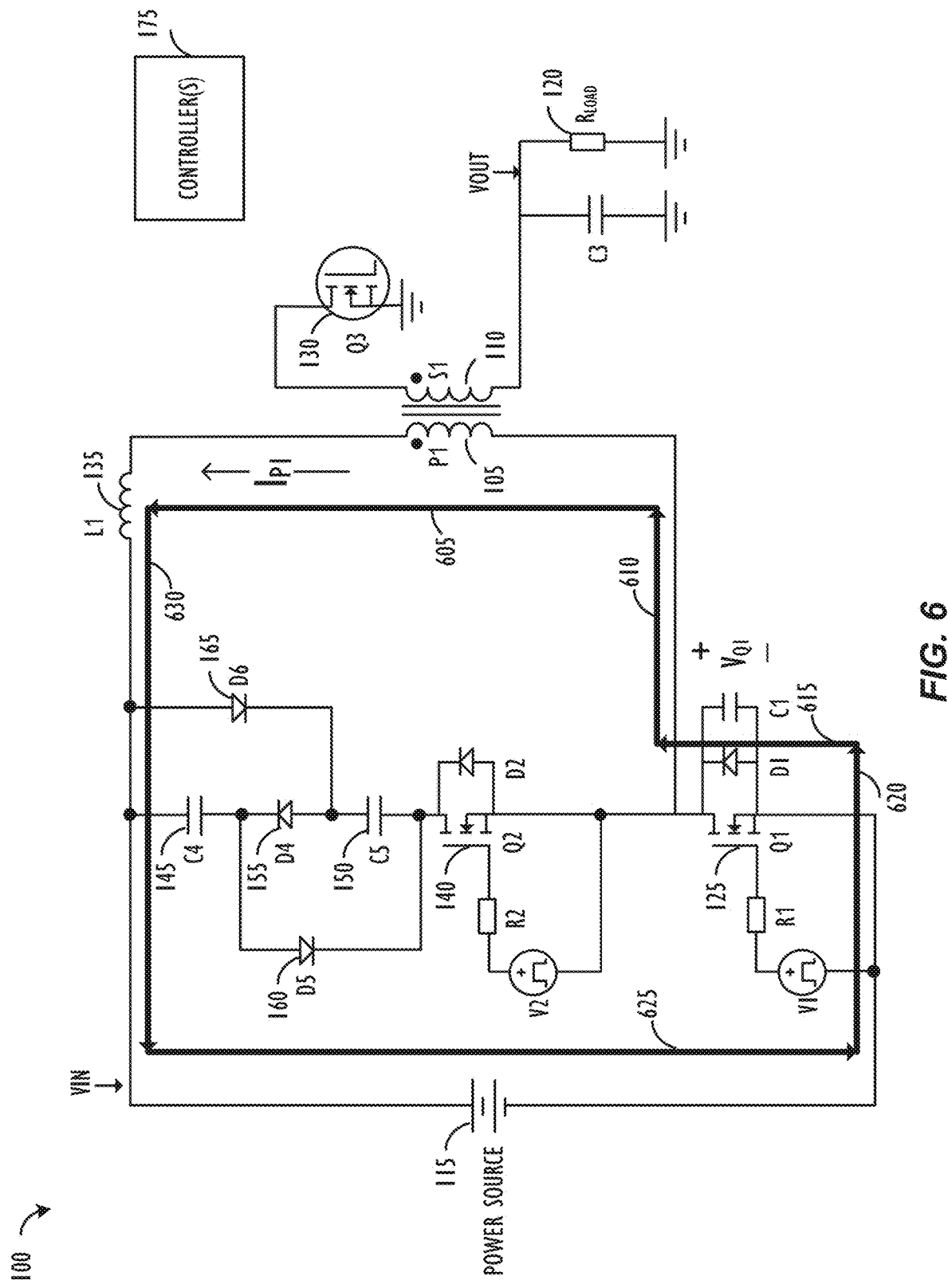
FIG. 6 shows the operation of exemplary flyback converter 100 in Operational Stage V in accordance with one embodiment.

The respective clamp voltage $V_{C4}$ and $V_{C5}$ of snubber capacitors C4 145 and C5 150 may decline as the absorbed leakage energy is depleted. As described in FIG. 3, snubber capacitors C4 145 and C5 150's clamp voltages (e.g., 50V) are contribute by the reflected output voltage $V_{OR}$ (e.g., 40V) and leakage energy of leakage inductance L1 135 (e.g., the additional 10V). Therefore, when snubber capacitors C4 145 and C5 150's clamp voltages fall to, for example, 40V, all the leakage energy will have been delivered to primary coil P1 105. Power converter 100 may then turn off clamp switch Q2 140 and enter Operational Stage V. As shown in FIG. 6, the reverse primary winding current $I_{P1}$ may continuously flow into primary coil P1 105 through the body diode D1 of primary switch Q1 125, as shown by lines 605-630, thus further delivering the leakage energy from primary coil P1 105 back to power source 115. The conduction of the body diode D1 may bring primary switch Q1 125's voltage $V_{Q1}$ close to zero (e.g., a forward voltage drop of the body diode D1). Thereby, after a predetermined delay, converter 100 may turn on primary switch Q1 125 to achieve ZVS for minimal losses. After primary switch Q1 125 is closed, power converter 100 may start the next cycle with Operational Stage I as described in FIG. 2. It is also possible that the energy in the reverse primary winding current IN is insufficient to discharge the sum of the parasitic capacitances of switches Q1 125, Q2 140, transformer (including primary coil P1 105 & secondary coil S1 110), and the reflected capacitance of secondary switch Q3 130 into the primary side completely to conduct the body diode D1. Therefore, alternatively primary switch Q1 125 may be turned on at a minimum non-zero voltage (e.g., near ZVS). In either case (i.e., with or without the conduction of body diode D1), primary switch Q1 125 may be turned on at a minimum voltage point to reduce turn-on losses.

Figure 7:
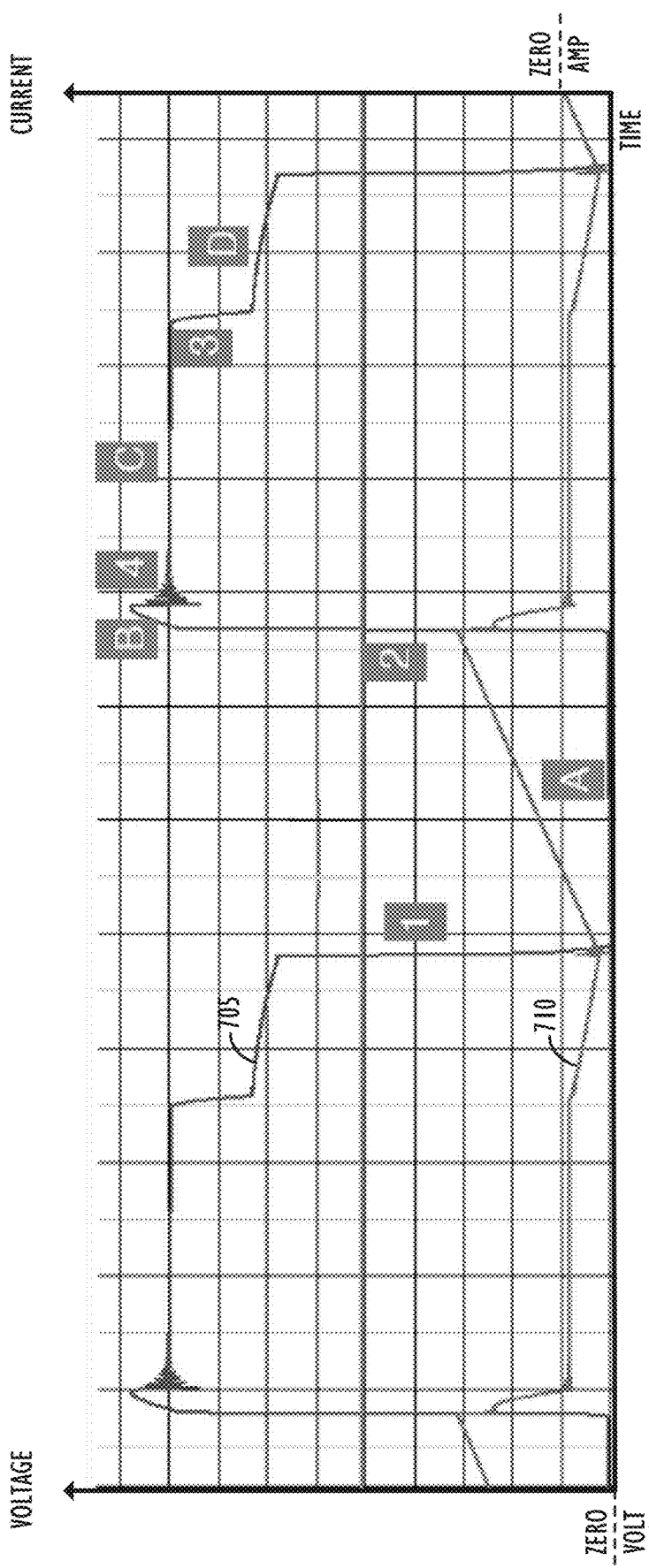
FIG. 7 shows waveforms of exemplary flyback converter 100 in accordance with one embodiment.

FIG. 7 shows waveforms of exemplary power converter 100 during Operational Stages I-V in accordance with one embodiment. As shown in FIG. 7, the horizontal axis represents time, the first vertical axis on the left represents voltage, and the second vertical axis on the right represents current. Waveform 705 depicts primary switch Q1 125's voltage $V_{Q1}$, while waveform 710 depicts primary winding current $I_{P1}$. FIG. 7 includes four sections (A, B, C and D) associated with four transitions (1, 2, 3, and 4). Among them, section A corresponds to Operational Stage I described in FIG. 1, after power converter 100 turns on primary switch Q1 125. Thereby, as shown herein, waveform 705 is close to zero to represent the small conduction voltage over primary switch Q1 125, and waveform 710 increases because of the building-up of primary winding current $I_{P1}$ through primary coil P1 105.

Transition 2 occurs when converter 100 turns off primary switch Q1 125 and turns on secondary switch Q3 130, corresponding to Operational Stage II described in FIG. 3. Operational Stage II may start with some dynamic transients, as shown by waveform 705 during section B and transition 4, to represent the transfer of leakage energy from leakage inductance L1 135 to snubber capacitors C4 145 and C5 150 (by charging the snubber capacitors in series). Meanwhile, stored energy in primary coil P1 105 may be also delivered to secondary coil S1 110. Thus, primary winding current $I_{P1}$ declines as shown by waveform 710. After all the leakage energy is transferred to snubber capacitors C4 145 and C5 150, primary switch Q1 125's voltage $V_{Q1}$ may settle down, as shown by waveform 705, to 400V, for example, according to equation (2) in FIG. 3. Snubber capacitors C4 145 and C5 150 may then be disconnected from primary coil P1 105, retaining the absorbed leakage energy and remaining at substantially constant clamp voltages, as shown by waveform 705, during section C, while the storage energy of primary coil P1 105 is being continuously transferred to secondary coil S1 110 and load 120.

Once the stored energy is transferred to the secondary side, power converter 100 may turn off secondary switch Q3 130 and enter Operational Stage III, as shown by transition 3 in FIG. 7. With reference to the descriptions in FIG. 4, primary coil P1 105 and the parasitic capacitance C1 of primary switch Q1 125 may form a LC resonant circuit, which may result in a sinusoidal voltage $V_{Q1}$ depicted by waveform 705 in FIG. 7. Note that waveform 705 shows only half of the first sine waveform.

Converter 100 may turn on clamp switch Q2 140 and enter Operational Stage IV. As described in FIG. 5, with the falling of voltage $V_{Q1}$ during the LC resonance, diodes D5 160 and D6 165 may become forward biased and start to conduct. Snubber capacitors C4 145 and C5 150 may start to discharge in parallel, generating a primary winding current $I_{P1}$ in an opposite direction as shown by waveform 710 during section D. As the absorbed leakage energy is transferred to primary coil P1 105, respective clamp voltages $V_{C4}$ and $V_{C5}$ of snubber capacitors C4 145 and C5 150 decrease. According to equation (2), voltage $V_{Q1}$ declines accordingly, as shown by waveform 705.

By the end of section D, respective clamp voltages $V_{C4}$ and $V_{C5}$ fall to half of the reflected output voltage $V_{OR}$ (e.g., 40V), and all the leakage energy has been delivered to primary coil P1 105. Converter 100 may turn off clamp switch Q2 140 and enter Operational Stage V, as shown by transition 1 in FIG. 7. According to the descriptions in FIG. 6, Operational Stage V may occupy only a short delay between turn-off of clamp switch Q2 140 and turn-on of primary switch Q1 125. The delay is inserted to allow for the conduction of the body diode D1 or to maximize the discharge of the parasitic capacitances as described in Operational Stage V. This may bring primary switch Q1 125's voltage $V_{Q1}$ to approximately zero, as shown by waveform 705, thus permitting primary switch Q1 125 to be turned on to achieve ZVS or near ZVS. Converter 100 may start the next cycle with duration A.

Figure 8:
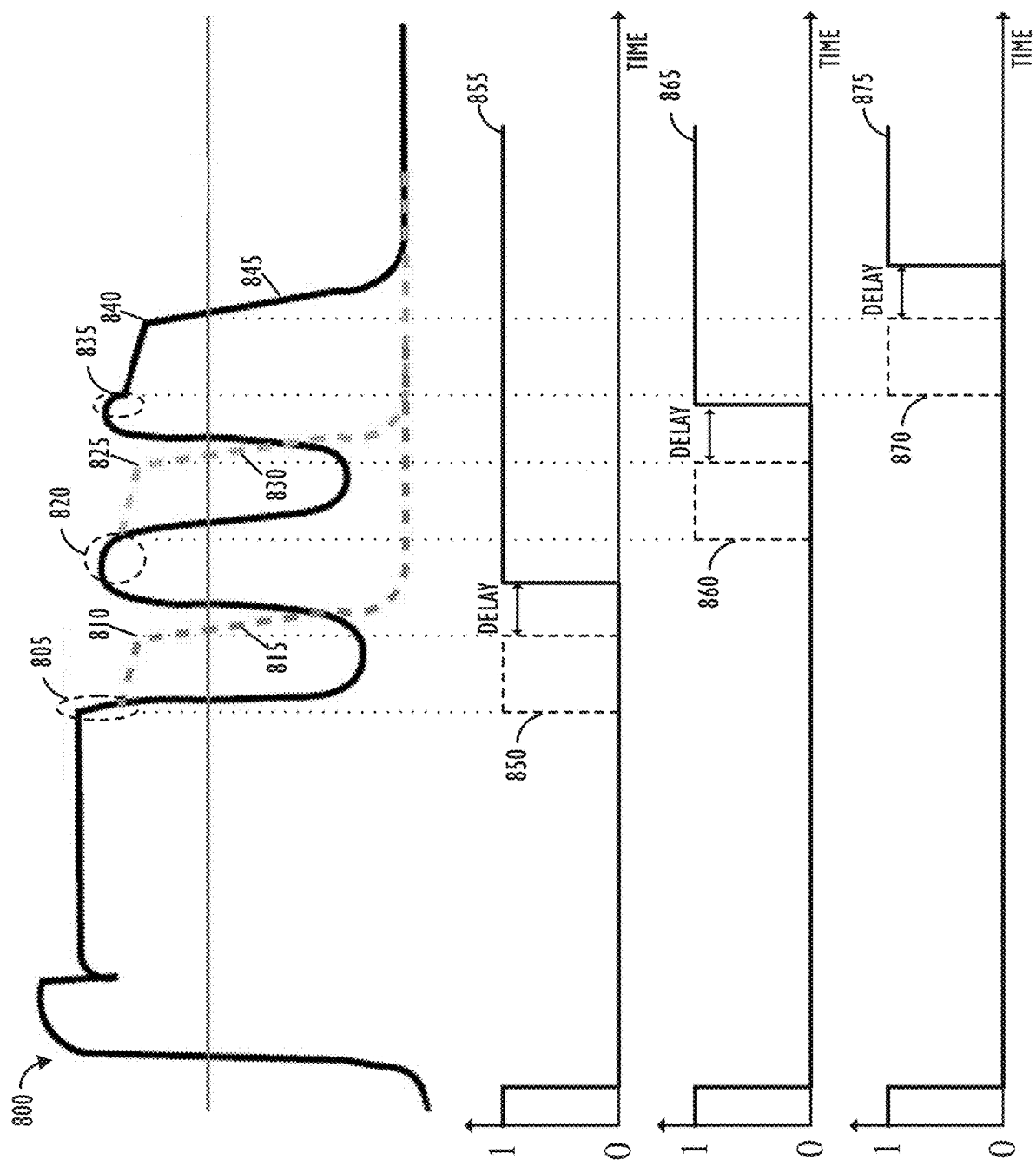
FIG. 8 shows the turn-on adjustments of a clamp switch of exemplary flyback converter 100 in accordance with one embodiment.

When the load of converter 100 becomes lighter, for example, by increasing resistance $R_{LOAD}$, less energy needs to be transferred from primary to secondary. Thus, sections A-D may become shorter. Correspondingly, the switching frequencies for switches Q1 125, Q2 140 and Q3 130 may become higher. For efficiency, EMI concerns, or other reasons, it may be desirable to avoid such high frequency operations. One way to reduce the switching frequency is to adjust the turn-on point of clamp switch Q2 140 (and the subsequent section D). FIG. 8 shows the adjustments of turn-on point for clamp switch Q2 140 in accordance with one embodiment. As shown herein, the adjustments will be explained in view of exemplary waveform 800 of voltage $V_{Q1}$ and corresponding gating signals for switches Q1 125 and Q2 140. Note that the horizontal axes represent time, and the numbers (0, 1) along the vertical axes represent (logic low, logic high) respectively, in FIG. 8.

As described above, after the leakage energy is absorbed by snubber capacitors C4 145 and C5 150, converter 100 may enter a LC resonance between primary coil P1 105 (and leakage inductance L1 135) and the parasitic capacitance C1 of primary switch Q1 125. The resonance may create a sinusoidal voltage $V_{Q1}$, as shown by waveform 800, for primary switch Q1 125. Sinusoidal voltage $V_{Q1}$ may include a plurality of peak values 805, 820 and 835, each of which may correspond to a valley voltage $V_{Q2}$ over clamp switch Q2 140. To minimize switching losses, it is thus desirable to turn on clamp switch Q2 140 selectively when voltage $V_{Q1}$ approach one of its peak values.

Referring to FIG. 8, clamp switch Q2 140 may be turned on at $V_{Q1}$'s first peak value 805 by gating signal 850. Subsequently, instead of continuing oscillation as shown by line 845, converter 100 may enter Operational Stage IV (section D in FIG. 7) as shown by dashed line 815. Snubber capacitors C4 145 and C5 150 may be discharged, and when their respective clamp voltage fall under a certain value, as indicated by corner 810, all leakage energy is transferred to primary coil P1 105. Clamp switch Q2 140 may be turned off by gating signal 850, and after a predetermined delay, voltage $V_{Q1}$ may decline to approximately zero due to the conduction of body diode D1 of primary switch Q1 125. Primary switch Q1 125 may be turned on by gating signal 855 to achieve ZVS.

Following the same principle, converter 100 may wait after the first full sinusoidal cycle of voltage $V_{Q1}$, and turn on clamp switch Q2 140 at voltage $V_{Q1}$'s second peak value 820 by gating signal 860. Similarly, instead of continuing oscillation as shown by line 845, converter 100 may enter Operational Stage IV (section D in FIG. 7) as shown by dashed line 830. Subsequently, when the leakage energy is transferred from snubber capacitors C4 145 and C5 150 to primary coil P1 105, as indicated by corner 810, converter 100 may turn off clamp switch Q2 140 by gating signal 860. After the predetermined delay, primary switch Q1 125 may be turned on by gating signal 865 to achieve ZVS.

Turn-on of clamp switch Q2 140 may be further delayed to voltage $V_{Q1}$'s third peak value 835, as shown by gating signal 870 in FIG. 8. In this case, primary switch Q1 125 may experience two full sinusoidal cycles before it starts to decline, as shown by solid line 845. Accordingly, clamp switch Q2 140 may be turned off after the leakage energy is transferred to primary coil P1 105 (as indicated by corner 840) by gating signal 870. Subsequently, after the predetermined delay, converter 100 may turn on primary switch Q1 125 by gating signal 875 to achieve ZVS.

Figure 9:
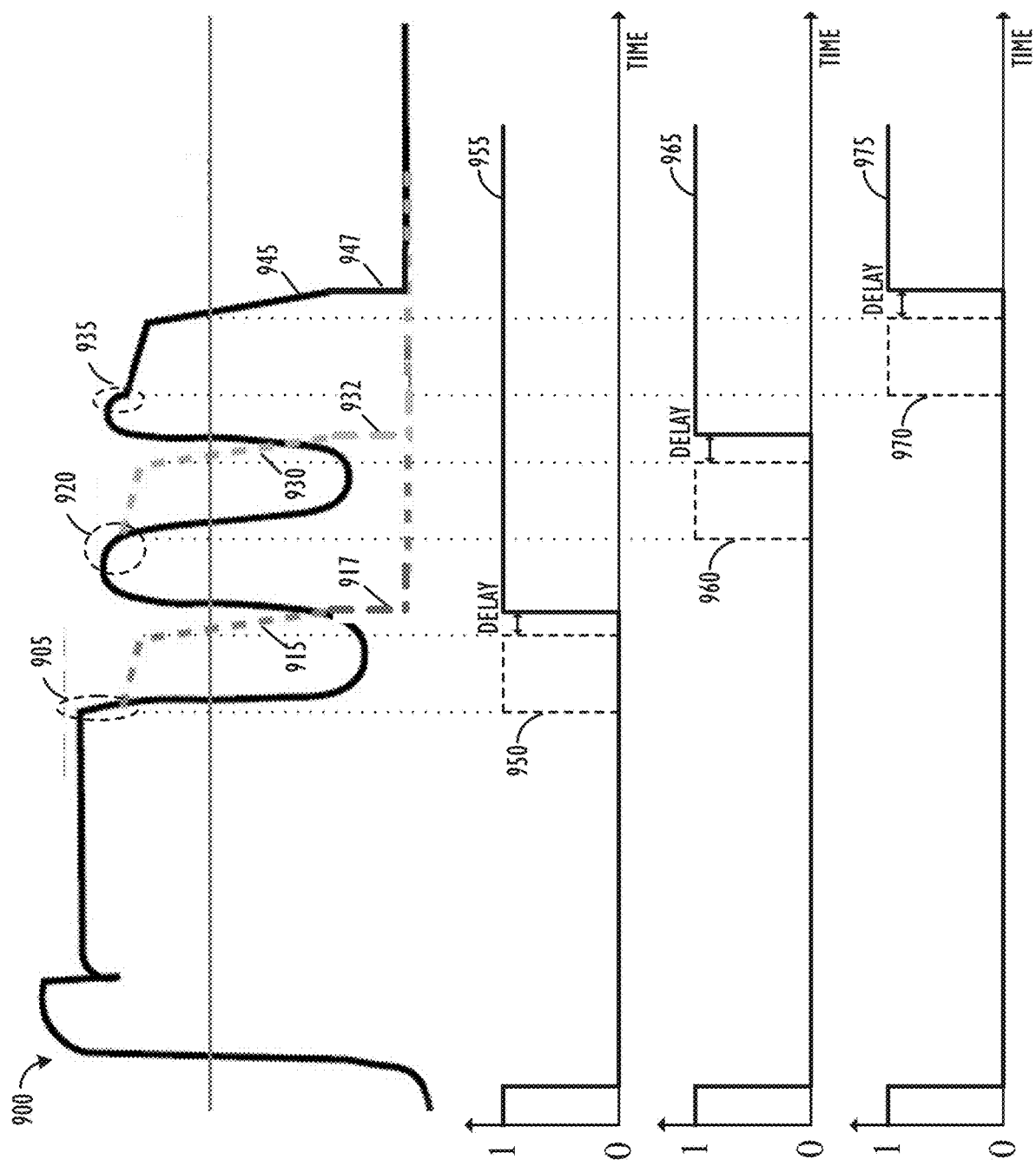
FIG. 9 shows the turn-on adjustments of a clamp switch of exemplary flyback converter 100 in accordance with another embodiment.

Alternatively, flyback converter 100 may turn on primary switch Q1 125 at a minimum non-zero voltage (e.g., near ZVS) without the conduction of its body diode D1 as described in Operational Stage V. From top to bottom, FIG. 9 shows waveform 900 of voltage $V_{Q1}$ of primary switch Q1 125, and gating signals for switches Q1 125 and Q2 140 corresponding to turning on clamp switch Q2 140 at the first, second and third peak voltages of $V_{Q1}$, respectively. Similar to the above descriptions in FIG. 8, clamp switch Q2 140 may be turned on at $V_{Q1}$'s first peak value 905 by gating signal 950. Subsequently, instead of continuing oscillation as shown by line 945, converter 100 may enter Operational Stage IV (section D in FIG. 7) as shown by dashed line 915. After switch Q2 140 turns off by gating signal 950, without the conduction of the body diode D1, switch Q1 125 may be turned on by gating signal 955 when its voltage $V_{Q1}$ reaches a minimum non-zero voltage, as shown by sharp falling edge 917.

Following the same principle, converter 100 may wait until voltage $V_{Q1}$'s second peak value 920 and then turn on clamp switch Q2 140 by gating signal 960. Similarly, instead of continuing oscillation as shown by line 945, converter 100 may enter Operational Stage IV (section D in FIG. 7) as shown by dashed line 930. When voltage $V_{Q1}$ reaches a minimum non-zero voltage, flyback converter 100 may turn on primary switch Q1 125 near ZVS by gating signal 965, as shown by sharp falling edge 932.

Finally, turn-on of clamp switch Q2 140 may be further delayed to voltage $V_{Q1}$'s third peak value 935, as shown by gating signal 970 in FIG. 9. In this case, primary switch Q1 125 may experience two full sinusoidal cycles before it starts to decline, as shown by solid line 945. Accordingly, converter 100 may turn on primary switch Q1 125 by gating signal 975 at a minimum non-zero voltage, as shown by sharp falling edge 947.

The peak values of voltage $V_{Q1}$ may be detected by monitoring falling edges of voltage $V_{Q1}$. Controller(s) 175 may also receive detection signal(s) for transitions of voltage $V_{Q1}$ from reflected output voltage (e.g., 80V) to half of the reflected output voltage (e.g., 40V), where each transition may be indicative of one sinusoidal cycle. Based on those feedback signals, controller(s) 175 may determine the corresponding peak values of voltage $V_{Q1}$ and thus the point to turn on clamp switch Q2 140 accordingly. Further, when the load of converter 100 reduces, converter 100 may enter a discontinuous conduction mode (DCM). In DCM, the switching of clamp switch Q2 140 may become asynchronous with sinusoidal voltage $V_{Q1}$. For example, clamp switch Q2 140 may be turned on at points other than at a peak value of voltage $V_{Q1}$.

The various embodiments described above are provided by way of illustration only and should not be constructed to limit the scope of the disclosure. Various modifications and changes can be made to the principles and embodiments herein without departing from the scope of the disclosure and without departing from the scope of the claims.

The invention claimed is:

1. A power conversion apparatus, comprising:
    a primary coil configured to receive an input voltage;
    a secondary coil electromagnetically coupled to the primary coil and configured to provide an output voltage;
    a first switch coupled to the primary coil and configured to control a flow of current through the primary coil;
    a second switch configured to control a flow of current through an active clamp circuit, the active clamp circuit coupled in parallel with the primary coil and configured to absorb a leakage energy from a leakage inductance associated with the primary coil and the secondary coil, the active clamp circuit comprising a first capacitor and a second capacitor; and
    a controller coupled to the first switch and the second switch, the controller configured to:
        turn the first switch on, so as to store energy in the primary coil;
        turn the first switch off, so as to charge the first and the second capacitors in series;
        turn the second switch on when a voltage across the first switch approaches a peak value, so as to discharge the first and the second capacitors in parallel; and
        turn the second switch off when at least one of: a voltage across the first capacitor and a voltage across the second capacitor, falls to a predetermined voltage level.

2. The power conversion apparatus of claim 1, wherein the first switch is turned on when a current is flowing through a body diode of the first switch or when the voltage across the first switch is determined to reach a minimum non-zero voltage.

3. The power conversion apparatus of claim 1, wherein the first capacitor and the second capacitor have equivalent capacitance.

4. The power conversion apparatus of claim 1, wherein the active clamp circuit further comprises a first diode.

5. The power conversion apparatus of claim 4, wherein the first diode is coupled in series with the first capacitor and the second capacitor to block any reverse current from discharging the first capacitor and the second capacitor in series.

6. The power conversion apparatus of claim 4, wherein the active clamp circuit further comprises a second diode and a third diode.

7. The power conversion apparatus of claim 6,
    wherein the second diode is coupled in parallel with the first capacitor and the first diode,
    wherein the third diode is coupled in parallel with the second capacitor and the first diode, and
    wherein the second diode and the third diode are configured to allow a flow of reverse current to discharge the first capacitor and the second capacitor in parallel.

8. The power conversion apparatus of claim 1,
    wherein the voltage across the first switch, after the first switch is turned off and before the second switch is turned on, represents a sinusoidal voltage that includes a plurality of peak values, and
    wherein the second switch is turned on when the voltage across the first switch approaches one of the plurality of peak values.

9. A method for operating a power conversion apparatus, comprising:
    receiving an input voltage at a primary coil;
    providing an output voltage at a secondary coil, the secondary coil electromagnetically coupled to the primary coil;
    controlling a flow of current through the primary coil by using a first switch; and
    controlling a flow of current through an active clamp circuit by using a second switch, the active clamp circuit coupled in parallel with the primary coil and configured to absorb a leakage energy from a leakage inductance associated with the primary coil and the secondary coil, the active clamp circuit comprising a first capacitor and a secondary capacitor,
    wherein the first switch and second switch are controlled by a controller, the controller configured to:
        turn the first switch on, so as to store energy in the primary coil;
        turn the first switch off, so as to charge the first and the second capacitors in series;
        turn the second switch on when a voltage across the first switch approaches a peak value, so as to discharge the first and the second capacitors in parallel; and
        turn the second switch off when at least one of: a voltage across the first capacitor and a voltage across the second capacitor, falls to a predetermined voltage level.

10. The method of claim 9, wherein the first switch is turned on when a current is flowing through a body diode of the first switch or when the voltage across the first switch is determined to reach a minimum non-zero voltage.

11. The method of claim 9, wherein the first capacitor and the second capacitor have equivalent capacitance.

12. The method of claim 9, wherein the active clamp circuit further comprises a first diode.

13. The method of claim 12, wherein the first diode is coupled in series with the first capacitor and the second capacitor to block any reverse current from discharging the first capacitor and the second capacitor in series.

14. The method of claim 12, wherein the active clamp circuit further comprises a second diode and a third diode.

15. The method of claim 14,
wherein the second diode is coupled in parallel with the first capacitor and the first diode,
wherein the third diode is coupled in parallel with the second capacitor and the first diode, and
wherein the second diode and the third diode are configured to allow a flow of reverse current to discharge the first capacitor and the second capacitor in parallel.

16. The method of claim 9,
wherein the voltage across the first switch, after the first switch is turned off and before the second switch is turned on, represent a sinusoidal voltage that includes a plurality of peak values, and
wherein the second switch is turned on when the voltage across the first switch approaches one of the plurality of peak values.

17. A power converter, comprising:
a primary coil coupled in series with a first switch, the primary coil configured to receive an input voltage;
a secondary coil electromagnetically coupled to the primary coil, the secondary configured to provide an output voltage;
an active clamp circuit coupled in parallel to the primary coil, the active clamp circuit comprising a second switch coupled in series with a first capacitor and a second capacitor; and
a controller coupled to the first switch and the second switch, the controller configured to:
turn the first switch on, so as to store energy in the primary coil;
turn the first switch off, so as to charge the first and the second capacitors in series;
turn the second switch on when a voltage across the first switch approaches a peak value, so as to discharge the first and the second capacitors in parallel; and
turn the second switch off when at least one of: a voltage across the first capacitor and a voltage across the second capacitor, falls to a predetermined voltage level.

18. The power conversion apparatus of claim 17, wherein the first switch is turned on when a current is flowing through its body diode or when the voltage across the first switch is determined to reach a non-zero minimum voltage.

19. The power conversion apparatus of claim 17, wherein the first capacitor and the second capacitor have the same capacitance.

20. The power conversion apparatus of claim 17, wherein the active clamp circuit further comprises a first diode.

21. The power conversion apparatus of claim 20, wherein the first diode is coupled in series with the first capacitor and the second capacitor to block any reverse current from discharging the first capacitor and the second capacitor in series.

22. The power conversion apparatus of claim 20, wherein the active clamp circuit further comprises a second diode and a third diode.

23. The power conversion apparatus of claim 22,
wherein the second diode is coupled in parallel with the first capacitor and the first diode,
wherein the third diode is coupled in parallel with the second capacitor and the first diode, and
wherein the second diode and the third diode are configured to allow a flow of reverse current to discharge the first capacitor and the second capacitor in parallel.

24. The power conversion apparatus of claim 17,
wherein the voltage across the first switch, after the first switch is turned off and before the second switch is turned on, represents a sinusoidal voltage that includes a plurality of peak values, and
wherein the second switch is turned on when the voltage across the first switch approaches one of the plurality of peak values.

* * * * *